(12) United States Patent
Fargo

(10) Patent No.: US 9,878,881 B2
(45) Date of Patent: Jan. 30, 2018

(54) MAGNETIC SCREW PROPULSION SYSTEM FOR ELEVATORS

(71) Applicant: OTIS ELEVATOR COMPANY, Farmington, CT (US)

(72) Inventor: Richard N. Fargo, Plainville, CT (US)

(73) Assignee: OTIS ELEVATOR COMPANY, Farmington, CT (US)

(*) Notice: Subject to any disclaimer, the term of this patent is extended or adjusted under 35 U.S.C. 154(b) by 309 days.

(21) Appl. No.: 14/443,780

(22) PCT Filed: Nov. 20, 2012

(86) PCT No.: PCT/US2012/065989
§ 371 (c)(1),
(2) Date: May 19, 2015

(87) PCT Pub. No.: WO2014/081407
PCT Pub. Date: May 30, 2014

(65) Prior Publication Data
US 2015/0307325 A1    Oct. 29, 2015

(51) Int. Cl.
*B66B 11/04* (2006.01)
*H02K 7/06* (2006.01)
(Continued)

(52) U.S. Cl.
CPC ...... *B66B 11/0438* (2013.01); *B66B 11/0407* (2013.01); *H02K 7/06* (2013.01);
(Continued)

(58) Field of Classification Search
CPC ... B66B 11/0438; B66B 11/0407; B66B 9/02; H02K 7/06; H02K 41/00; H02K 49/102
See application file for complete search history.

(56) References Cited

U.S. PATENT DOCUMENTS 3,898,487 A    8/1975  Sobiepanek et al.
5,079,458 A *  1/1992  Schuster ............... H02K 41/00
                                                    310/12.24
(Continued)

FOREIGN PATENT DOCUMENTS

DE    3120328 A1    12/1982
GB    1434809 A     5/1976
(Continued)

OTHER PUBLICATIONS

Japanese Office Action for application 2015-543020, dated Jun. 7, 2016, 7 pages.
(Continued)

*Primary Examiner* — Michael A Riegelman
(74) *Attorney, Agent, or Firm* — Cantor Colburn LLP

(57) ABSTRACT

A propulsion system includes a magnetic screw having a first magnetic element having a first polarity, the first magnetic element arranged along a first non-linear path along a longitudinal axis of the magnetic screw and a second magnetic element having a second polarity, the second magnetic element arranged along a second non-linear path along the longitudinal axis of the magnetic screw; a motor for rotating the magnetic screw about the longitudinal axis; and a stator made from a ferrous material, the stator having a body with an internal cavity, the body including a plurality of poles extending into the cavity, the poles arranged along a pole non-linear path along a longitudinal axis of the stator.

29 Claims, 6 Drawing Sheets

(51) Int. Cl.
*H02K 49/10* (2006.01)
*H02K 41/00* (2006.01)
*B66B 9/02* (2006.01)

(52) U.S. Cl.
CPC .......... *H02K 41/00* (2013.01); *H02K 49/102* (2013.01); *B66B 9/02* (2013.01)

(56) References Cited

U.S. PATENT DOCUMENTS

| | | | |
|---|---|---|---|
| 5,234,079 A | 8/1993 | Nomura | |
| 5,661,446 A * | 8/1997 | Anderson | H02K 41/031 310/13 |
| 6,822,349 B2 | 11/2004 | Lunz et al. | |
| 2002/0125075 A1 * | 9/2002 | Lin | B66B 9/025 187/267 |
| 2004/0027020 A1 | 2/2004 | Newcomb | |
| 2005/0029887 A1 | 2/2005 | Fecera | |
| 2007/0170006 A1 * | 7/2007 | Kuo | B66B 9/025 187/267 |
| 2015/0368071 A1 * | 12/2015 | Witczak | B66B 9/02 187/250 |

FOREIGN PATENT DOCUMENTS

| | | |
|---|---|---|
| JP | S6225868 A | 2/1987 |
| JP | H0257751 A | 2/1990 |
| JP | H0552248 A | 3/1993 |
| JP | H06335229 A | 12/1994 |
| JP | H08226512 A | 9/1996 |
| JP | 2000061765 A | 2/2000 |
| JP | 2000072355 A | 3/2000 |
| JP | 2001278568 A | 10/2001 |
| JP | 2001294381 A * | 10/2001 |
| JP | 2002021965 A | 1/2002 |
| JP | 2000255949 A | 7/2004 |
| JP | 2004182362 A | 7/2004 |

OTHER PUBLICATIONS

European search report for application EP 12888954.0, dated Nov. 2, 2016, 7 pages.
Notification of Transmittal of the International Search Report and the Written Opinion of the International Searching Authority, or the Declaration; PCT/US2012/065989; dated Jun. 2, 2013, 4 Pages.
Written Opinion of the International Searching Authority; PCT/US2012/065989; dated Jun. 2, 2013, 5 Pages.
Chinese Office Action for application CN 201280077136.1, dated Jul. 5, 2016, 26 pages.
Wang, Qi, "Magnetic Screw Pair" Manufacturing Technology & Machine Tool, No. 10, 1996, Total Issue No. 411, 4 pages.

* cited by examiner

MAGNETIC SCREW PROPULSION SYSTEM FOR ELEVATORS

FIELD OF INVENTION

The subject matter disclosed herein relates generally to the field of propulsion systems, and more particularly, to a magnetic screw propulsion system for elevators.

BACKGROUND

Self-propelled elevator systems, also referred to as ropeless elevator systems, are useful in certain applications (e.g., high rise buildings) where the mass of the ropes for a roped system is prohibitive and there is a need for multiple elevator cars in a single hoistway. Existing self-propelled elevator systems employ a linear motor along the hoistway. While such designs are well suited for their intended purposes, alternatives to linear motors would be well received in the art.

BRIEF SUMMARY

According to an exemplary embodiment of the invention, a propulsion system includes a magnetic screw having a first magnetic element having a first polarity, the first magnetic element arranged along a first non-linear path along a longitudinal axis of the magnetic screw and a second magnetic element having a second polarity, the second magnetic element arranged along a second non-linear path along the longitudinal axis of the magnetic screw; a motor for rotating the magnetic screw about the longitudinal axis; and a stator made from a ferrous material, the stator having a body with an internal cavity, the body including a plurality of poles extending into the cavity, the poles arranged along a pole non-linear path along a longitudinal axis of the stator.

According to another exemplary embodiment of the invention, an elevator propulsion system includes a magnetic propulsion assembly configured for connection to an elevator car, the magnetic propulsion assembly including: a magnetic screw having a first magnetic element having a first polarity, the first magnetic element arranged along a first non-linear path along a longitudinal axis of the magnetic screw and a second magnetic element having a second polarity, the second magnetic element arranged along a second non-linear path along the longitudinal axis of the magnetic screw; a motor for rotating the magnetic screw about the longitudinal axis to impart motion to the elevator car; and a brake for stopping rotation of the magnetic screw; and a stator made from a ferrous material, the stator having a body with an internal cavity, the body including a plurality of poles extending into the cavity, the poles arranged along a pole non-linear path along a longitudinal axis of the stator.

According to another exemplary embodiment of the invention, an elevator system includes an elevator car for travel in a hoistway; a magnetic propulsion assembly coupled to the elevator car, the magnetic propulsion assembly including: a magnetic screw having a first magnetic element having a first polarity, the first magnetic element arranged along a first non-linear path along a longitudinal axis of the magnetic screw and a second magnetic element having a second polarity, the second magnetic element arranged along a second non-linear path along the longitudinal axis of the magnetic screw; a motor for rotating the magnetic screw about the longitudinal axis to impart motion to the elevator car; and a brake for stopping rotation of the magnetic screw; and a stator positioned along a length of the hoistway, the stator made from a ferrous material, the stator having a body with an internal cavity, the body including a plurality of poles extending into the cavity, the poles arranged along a pole non-linear path along a longitudinal axis of the stator.

According to another exemplary embodiment of the invention, a propulsion system includes a screw having a first ferrous element, the first ferrous element arranged along a first non-linear path along a longitudinal axis of the screw and a second ferrous element, the second ferrous element arranged along a second non-linear path along the longitudinal axis of the screw; a motor for rotating the screw about the longitudinal axis; and a stator having a body with an internal cavity, the body including a plurality of first poles having a first polarity extending into the cavity, the first poles arranged along a first pole non-linear path along a longitudinal axis of the stator, the body including a plurality of second poles having a second polarity extending into the cavity, the second poles arranged along a second pole non-linear path along a longitudinal axis of the stator.

Other aspects, features, and techniques of embodiments of the invention will become more apparent from the following description taken in conjunction with the drawings.

BRIEF DESCRIPTION OF THE DRAWINGS

Referring now to the drawings wherein like elements are numbered alike in the FIGURES.

DETAILED DESCRIPTION

Figure 1:
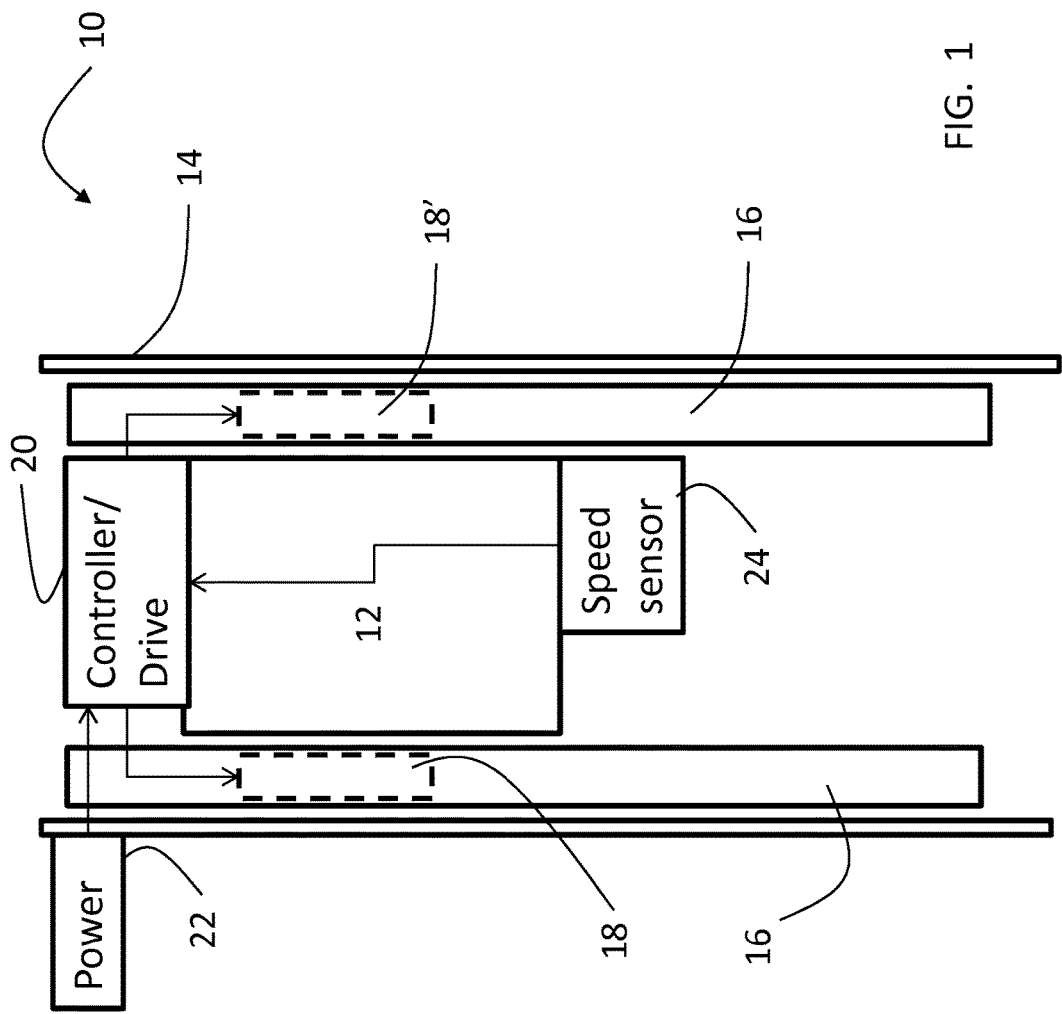
FIG. 1 depicts an elevator system having a magnetic screw propulsion system in an exemplary embodiment.

FIG. 1 depicts an elevator system 10 having a magnetic screw propulsion system in an exemplary embodiment. Elevator system 10 includes an elevator car 12 that travels in a hoistway 14. Stators 16 are positioned in the hoistway 14 and coact with magnetic screw assemblies 18 and 18' coupled to car 12 to impart motion to car 12. Stator 16 and magnetic screw assemblies 18 and 18' are described in further detail herein. It is understood that other components of the elevator system (e.g., guide rails, safeties) are not show for ease of illustration.

A controller 20 provides control signals to the magnetic screw assemblies 18 and 18' to control motion of the car (e.g., upwards or downwards) and to stop car 12. Controller 20 may be implemented using a general-purpose microprocessor executing a computer program stored on a storage medium to perform the operations described herein. Alternatively, controller 20 may be implemented in hardware (e.g., ASIC, FPGA) or in a combination of hardware/software. Controller 20 may also be part of an elevator control system. Power source 22 provides power to motors in the magnetic screw assemblies 18 and 18' under the control of controller 20. Power source 22 may be distrusted along a rail in the hoistway 14 to power magnetic screw assemblies 18 and 18' as car 12 travels. A speed sensor 24 provides a speed signal indicative of the speed of car 12 to controller 20. Controller 20 can alter the control signals to the magnetic screw assemblies 18 in response to car speed. It is understood that other sensors (e.g., position sensor, accelerometers) may be used for controlling motion of car 12.

Figure 2:
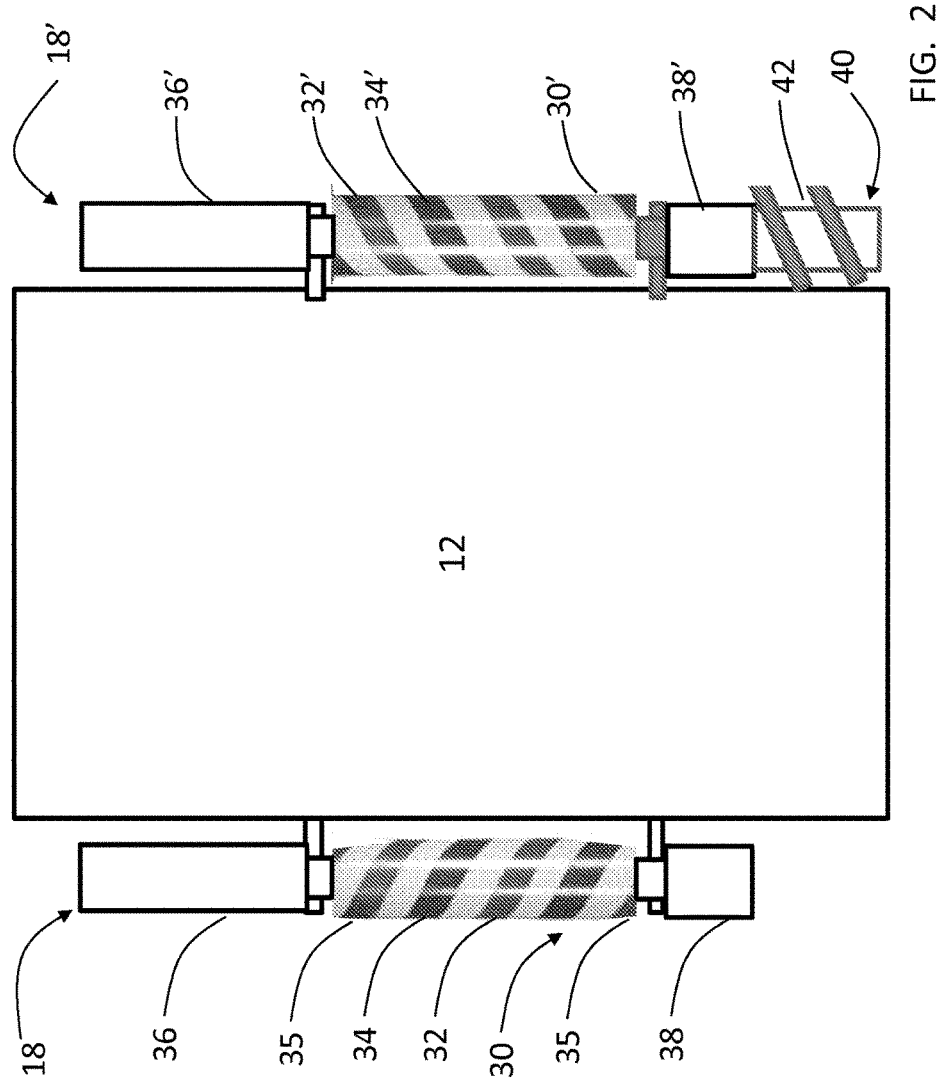
FIG. 2 depicts an elevator car and magnetic screw assemblies in an exemplary embodiment.

FIG. 2 depicts an elevator car 12 and magnetic screw assemblies 18 and 18' in an exemplary embodiment. Magnetic screw assembly 18 includes a magnetic screw 30 having a magnetic element in the form of first permanent magnet 32 of a first polarity positioned along a non-linear (e.g., helical) path along a longitudinal axis of the magnetic screw 30. A second magnetic element in the form of a second permanent magnet 34 of a second polarity (opposite the first polarity) is positioned along a non-linear (e.g., helical) path along a longitudinal axis of the magnetic screw 30. The paths of the first permanent magnet 32 and second permanent magnet 34 do not intersect.

A motor 36 (e.g., a spindle motor) is positioned at a first end of the magnetic screw 30 and rotates the magnetic screw 30 about its longitudinal axis in response to control signals from controller 20. In an exemplary embodiment, the outer diameter of motor 36 is less than the outer diameter of magnetic screw 30 to allow the motor 36 to travel within a cavity in stator 16. A brake 38 (e.g., a disk brake) is positioned at a second end of the magnetic screw 30 to apply a braking force in response to control signals from controller 20. In an exemplary embodiment, the outer diameter of brake 38 is less than the outer diameter of magnetic screw 30 to allow the brake 38 to travel within a cavity in stator 16. In an exemplary embodiment, brake 38 may be a disk brake. Further, brake 38 may be part of motor 36 in a single assembly. Magnetic screw assembly 18 is coupled to the car 12 through supports, such as rotary and/or thrust bearings.

A second magnetic screw assembly 18' may be positioned on an opposite side of car 12. Components of the second magnetic screw assembly 18' are similar to those in the first magnetic screw assembly 18 and labeled with similar reference numerals. Magnetic screw 30' has a first permanent magnet 32' of a first polarity positioned along a non-linear (e.g., helical) path along a longitudinal axis of the magnetic screw 30'. A second permanent magnet 34' of a second polarity (opposite the first polarity) is positioned along a non-linear (e.g., helical) path along a longitudinal axis of the magnetic screw 30'.

The pitch direction of the helical path of the first permanent magnet 32' and the second permanent magnet 34' is opposite that of the helical path of the first permanent magnet 32 and the second permanent magnet 34. For example, the helical path of the first permanent magnet 32 and the second permanent magnet 34 may be counter clockwise whereas the helical path of the first permanent magnet 32' and the second permanent magnet 34' is clockwise. Further, motor 36' rotates in a direction opposite to the direction of motor 36. The opposite pitch and rotation direction of the magnetic screw assemblies 18 and 18' balances rotational inertia forces on car 12 during acceleration.

A backup propulsion assembly 40 is coupled to car 12 to impart motion to car 12 in overload situations. The backup propulsion assembly 40 includes a mechanical screw 42 that normally travels within stator 16 without coacting with stator 16. Upon a fault, the mechanical screw 42 is positioned to engage the stator 16. Rotation of the mechanical screw 42 imparts motion to car 12.

Figure 3:
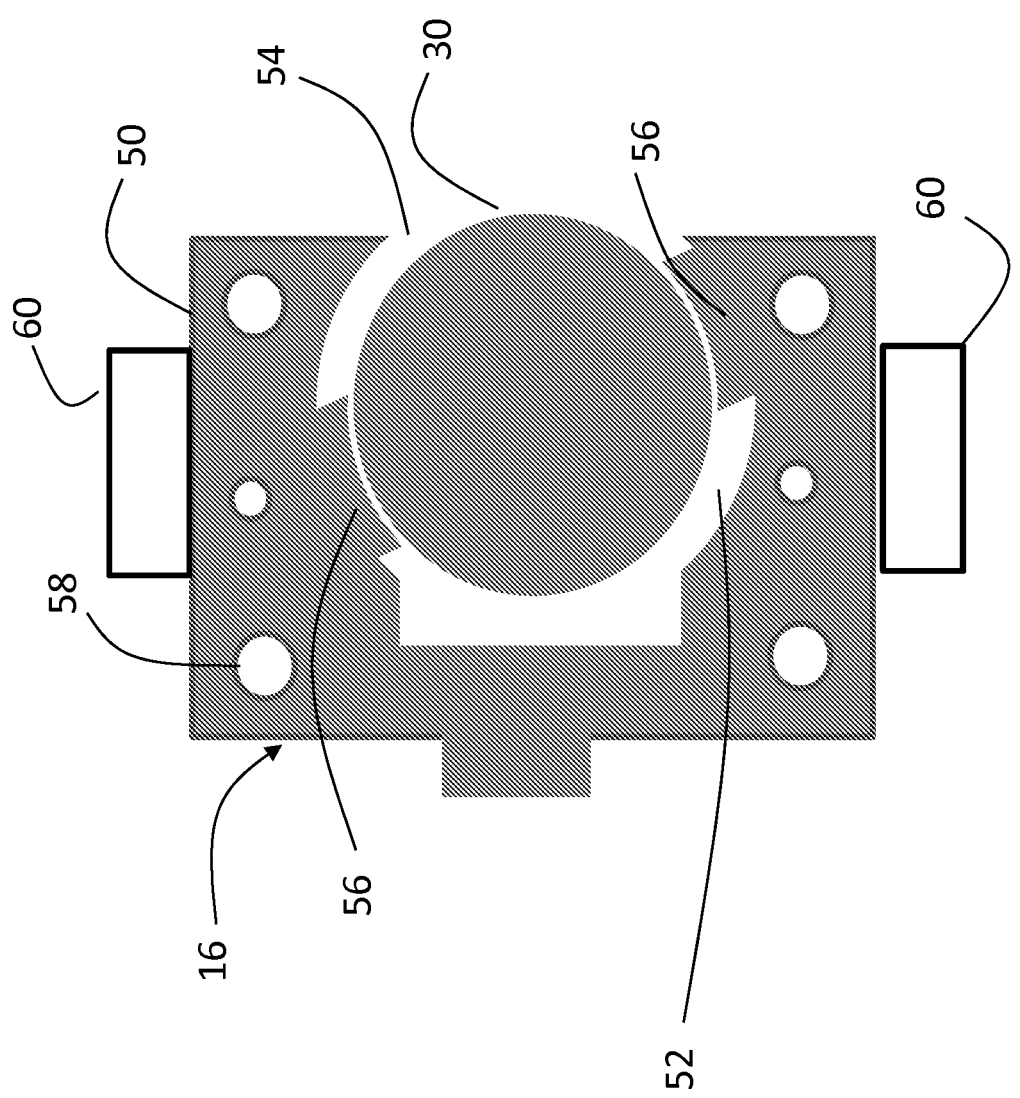
FIG. 3 is a top view of a stator and a magnetic screw in an exemplary embodiment.
Figure 4:
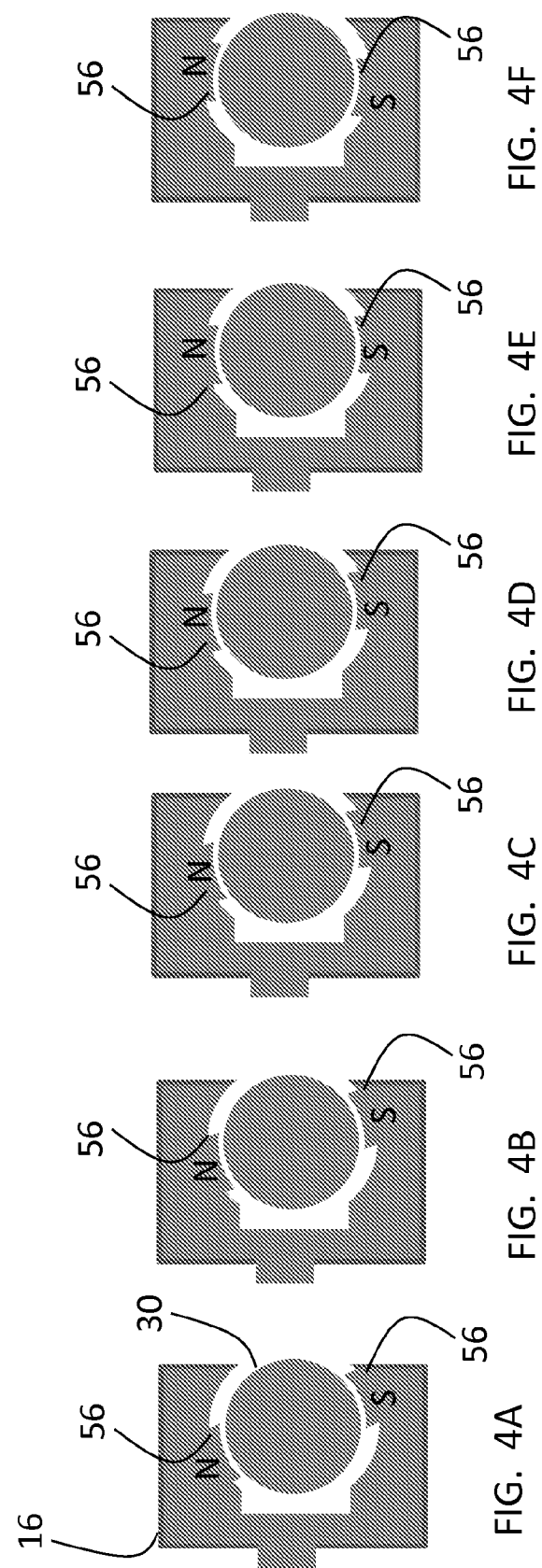
FIGS. 4A-4F depict a series of cross sections of the stator and the magnetic screw in an exemplary embodiment.

FIG. 3 is a top view of stator 16 and magnetic screw 30 in an exemplary embodiment. Stator 16 has a body 50 of generally rectangular cross section having a generally a circular cavity 52 in an interior of body 50. Body 50 has an opening 54 leading to cavity 52. Poles 56 extend inwardly into cavity 52 to magnetically coact with magnetic screw 30 to impart motion to the magnetic screw 30 and car 12. The orientation of the poles 56 is described in further detail with reference to FIGS. 4A-4F.

Stator 16 may be formed using a variety of techniques. In one embodiment, stator 16 is made from a series of stacked plates of a ferrous material (e.g., steel or iron). As shown in FIG. 3, each plate may have holes 58 for aligning a stack of plates and bolting the plates together in stack. In other embodiments, stator 16 may be formed from a corrugated metal pipe (e.g., steel or iron) having helical corrugations. The helical corrugations serve as the poles 56 on the interior of the pipe. An opening, similar to opening 54 in FIG. 3, would be machined in the pipe. In other embodiments, stator 16 may be formed by stamping poles 56 into a sheet of ferrous material (e.g., steel or iron) and then bending the sheet along its longitudinal axis to form stator 16.

The outer surfaces of body 50 may be smooth and provide a guide surface for one or more stiff guide rollers 60. Guide rollers 60 may be coupled to the magnetic screw assembly 18 to center the magnetic screw 30 within stator 16. Centering the magnetic screw 30 in stator 16 maintains an airgap between the magnetic screw 30 and poles 56. A lubricant or other surface treatment may be applied to the outer surface of body 50 to promote smooth travel of the guide rollers 60.

FIGS. 4A-4F depict a series of sequential cross sections of the stator 16 and magnetic screw 30 in an exemplary embodiment. As shown in FIGS. 4A-4F, the poles 56 on the interior of the stator 16 are arranged along the interior of the stator along non-linear (e.g., helical) pole paths along the longitudinal axis of the stator 16. Two poles 56 are shown, but embodiments are not limited to a particular number of stator poles. In the presence of the magnetic screw 30, poles 56 assume a magnetic polarity as shown, for example, in FIGS. 4A-4F. As the magnetic screw 30 rotates, poles 56 retain the original magnetic polarity. The magnetic repulsion and/or attraction between the poles 56 and the magnetic screw 30 cause a linear translation of the magnetic screw 30 with rotation of the magnetic screw 30. This causes the elevator car 12 to move up or down based on the direction of rotation of the magnetic screw 30.

The magnetic screw 30 may be manufactured using a variety of constructions. In an exemplary embodiment, magnetic elements in the form of flexible magnetic strips are helically wound around a hollow, cylindrical ferrous core (e.g., steel, iron). One magnetic strip has a North polarity facing the core and the other magnetic strip has a South polarity facing the core. In an exemplary embodiment, the strips are approximately 25 mm wide and 6 mm thick, with a space of 25 mm between them, forming two helixes, with opposite polarities. The magnetic strips may be secured to the core with an adhesive. The entire magnetic screw 30 may be wound in a thin fiberglass/epoxy covering. The magnetic screw 30 may also be dynamically balanced.

In an alternate embodiment, magnetic elements in the form of rare earth magnets are attached to the surface of a hollow, cylindrical ferrous core in a helical path. A first set of magnets has North polarity facing the core and a second set of magnets has a South polarity facing the core. In an exemplary embodiment, rows of magnets are 25 mm wide, with 25 mm space between them, forming two helixes, with opposite polarities. The magnetics may be secured to the core with an adhesive. The entire magnetic screw 30 may be wound in a thin fiberglass/epoxy covering. The magnetic screw 30 may also be dynamically balanced.

Figure 5:
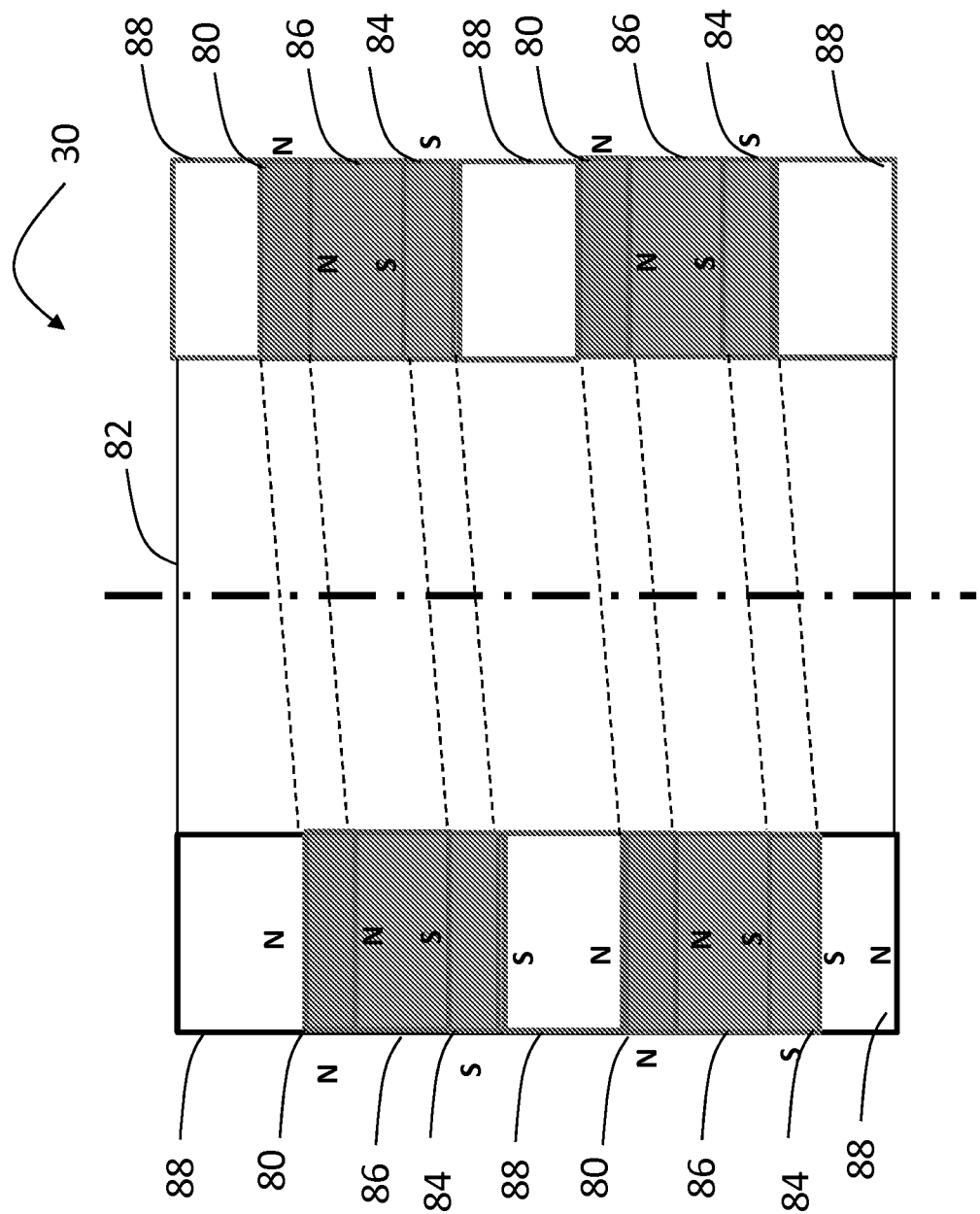
FIG. 5 depicts a cross section of a magnetic screw in an exemplary embodiment.

In another exemplary embodiment, vertically oriented permanent magnets are used along with strips of ferrous material (e.g., steel or iron). FIG. 5 depicts a cross section of a portion of a magnetic screw in an exemplary embodiment. A first magnetic element in the form of first strip of ferrous material 80 is wound around a non-ferrous core 82 in a non-linear path (e.g., helical). A second magnetic element in the form of second strip of ferrous material 84 is wound around the non-ferrous core 82 in a non-linear path (e.g., helical). Permanent magnets 86 are placed between strips 80 and 84 to magnetize first strip 80 with a North polarity and magnetize second strip 84 with a South polarity. Sections 88 may be non-magnetic spacers, or permanent magnets having poles aligned with the polarity of adjacent strips 80 and 84. The arrangement shown in FIG. 5 may repeat along the entire length of the magnetic screw 30. By adjusting the dimensions of the magnets 86 and strips 80 and 84, the flux can be concentrated to the desired level. The entire magnetic screw 30 may be wound in a thin fiberglass/epoxy covering. The magnetic screw 30 may also be dynamically balanced.

Figure 6:
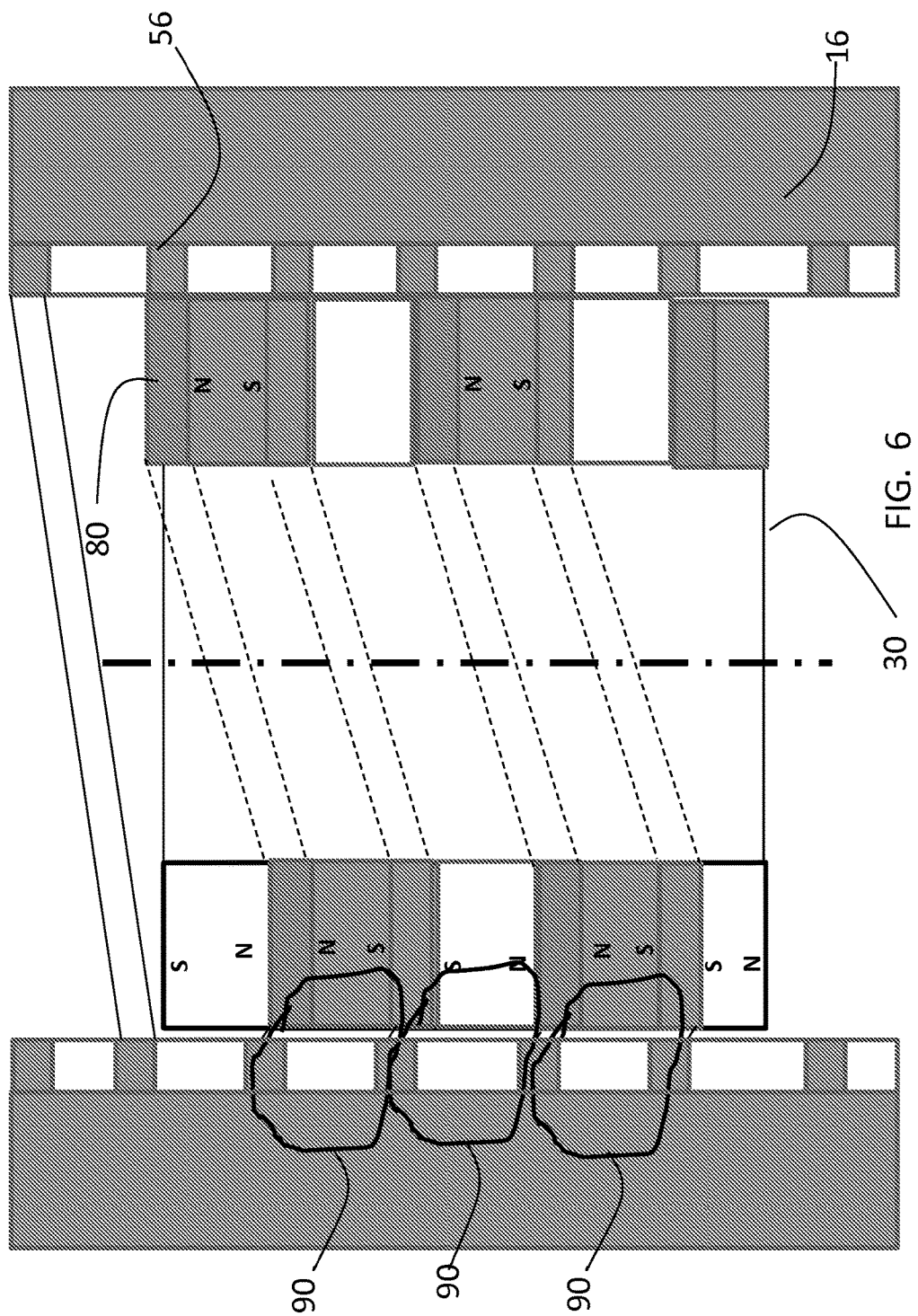
FIG. 6 depicts a cross section of a portion of a magnetic screw and a stator in an exemplary embodiment.

FIG. 6 depicts a cross section of a portion of a magnetic screw 30 and stator 16 in an exemplary embodiment. As shown in FIG. 6, a vertical offset in alignment of magnetic poles on screw and stator provide a vertical component of force. For example, pole on strip 80 is offset relative to pole 56 on stator 16. Also shown in FIG. 6 are magnetic flux paths 90 from the magnetic screw 30 through stator 16. FIG. 6 illustrates a full ½ pitch offset along the magnetic screw 30. In other words, a north pole on the right side off the cross section should be exactly half way between two north poles on the left side off the cross section.

The magnetic screw propulsion system employs a magnetic screw that effectively provides gearing so that motors 36 can have a high speed (e.g., 6000 RPM), and small size and weight when compared to direct linear motors. The high speed motors 36 may employ thermal management, in the form of a fan for air cooling motor 36 and/or a liquid cooled assembly employing a radiator and fan.

The use of magnetic screw assembly 18 for elevator propulsion provides a number of benefits. The magnetic screw assembly 18 allows standard motor brakes to be used, eliminating the need for linear brakes or safeties. Using two magnetic screw assemblies 18 and 18' provides full redundancy, where one magnetic screw assembly can operate if the other fails. Motors 36 can be shorted to provide emergency stopping of car 12. Motors 36 and magnetic screws 30 also act as flywheels, preventing high deceleration upon an emergency stop of car 12. The stator 16 experiences only one magnetic cycle per car passing, which limits iron losses.

Flux may be tapered at the end of the magnetic screw 30 to minimize high frequency content and associated losses. As shown in FIG. 2, one or both ends of magnetic screw 30 may be tapered in diameter as shown at 35. The reduced diameter at the ends of magnetic screw 30 serves to increase flux gradually, as the airgap between magnetic screw 30 and poles 56 is larger at initial engagement between stator 16 and magnetic screw 30. The airgap is reduced over several rotations of magnetic screw 30, as magnetic screw 30 travels along stator 16. Magnetic screw 30' may be similarly configured.

In an alternate embodiment, the stator 16 is configured to have magnetic poles and the screw 30 includes ferrous elements, either permanently magnetized or lacking a permanent magnetic field. In this embodiment, poles 56 include a first magnetic element (e.g., permanent magnet, electromagnet) of a first polarity positioned along a non-linear (e.g., helical) path along an interior of the stator 16. Poles 56 also include a second magnetic element (e.g., permanent magnet or electro magnet) of a second polarity positioned along a non-linear (e.g., helical) path along an interior of the stator 16. The paths of the first poles and second poles do not intersect. Screw assembly 18 includes ferrous elements in the form a first ferrous element (e.g., iron, steel) positioned along a first non-linear (e.g., helical) path along a longitudinal axis of the screw. The first ferrous elements may be formed from strips of ferrous material wound around the screw surface or individual ferrous elements positioned along the first non-linear path. A second ferrous element (e.g., iron, steel) is positioned along a second non-linear (e.g., helical) path along a longitudinal axis of the screw. The second ferrous elements may be formed from strips of ferrous material wound around the screw surface or individual ferrous elements positioned along the second non-linear path. The paths of the first ferrous element and second ferrous element do not intersect.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as being limited by the foregoing description, but is only limited by the scope of the appended claims.

The invention claimed is:

1. A propulsion system comprising:
   a magnetic screw having a first magnetic element having a first polarity, the first magnetic element arranged along a first non-linear path along a longitudinal axis of the magnetic screw and a second magnetic element having a second polarity, the second magnetic element arranged along a second non-linear path along the longitudinal axis of the magnetic screw;
   a motor for rotating the magnetic screw about the longitudinal axis; and
   a stator made from a ferrous material, the stator having a body with an internal cavity, the body including a plurality of poles extending into the cavity, the poles arranged along a pole non-linear path along a longitudinal axis of the stator;
   a backup propulsion system having a mechanical screw, wherein the mechanical screw can engage the stator.

2. The propulsion system of claim 1 wherein: at least one of the first non-linear path, the second non-linear path and the pole non-linear path is helical.

3. The propulsion system of claim 1 wherein: the first magnetic element includes a strip permanent magnet having a surface with the first polarity facing away from the magnetic screw.

4. The propulsion system of claim 1 wherein: the first magnetic element includes a plurality of first permanent magnets arranged along the first non-linear path, the plurality of first permanent magnets having a surface with the first polarity facing away from the magnetic screw.

5. The propulsion system of claim 4 wherein: the second magnetic element includes a plurality of second permanent magnets arranged along the second non-linear path, the plurality of second permanent magnets having a surface with the second polarity facing away from the magnetic screw.

6. The propulsion system of claim 1 wherein: the first magnetic element includes a first strip of ferrous material adjacent to a first pole of a permanent magnet.

7. The propulsion system of claim 6 wherein: the second magnetic element includes a second strip of ferrous material adjacent to a second pole of the permanent magnet.

8. A propulsion system comprising:
a magnetic screw having a first magnetic element having a first polarity, the first magnetic element arranged along a first non-linear path along a longitudinal axis of the magnetic screw and a second magnetic element having a second polarity, the second magnetic element arranged along a second non-linear path along the longitudinal axis of the magnetic screw;
a motor for rotating the magnetic screw about the longitudinal axis; and
a stator made from a ferrous material, the stator having a body with an internal cavity, the body including a plurality of poles extending into the cavity, the poles arranged along a pole non-linear path along a longitudinal axis of the stator;
wherein at least one end of the magnetic screw is tapered in diameter to provide an increased airgap between the magnetic screw and the stator at the tapered end.

9. An elevator propulsion system comprising:
a magnetic propulsion assembly configured for connection to an elevator car, the magnetic propulsion assembly including:
a magnetic screw having a first magnetic element having a first polarity, the first magnetic element arranged along a first non-linear path along a longitudinal axis of the magnetic screw and a second magnetic element having a second polarity, the second magnetic element arranged along a second non-linear path along the longitudinal axis of the magnetic screw;
a motor for rotating the magnetic screw about the longitudinal axis to impart motion to the elevator car;
a brake for stopping rotation of the magnetic screw; and
a stator made from a ferrous material, the stator having a body with an internal cavity, the body including a plurality of poles extending into the cavity, the poles arranged along a pole non-linear path along a longitudinal axis of the stator;
a backup propulsion system having a mechanical screw, wherein the mechanical screw can engage the stator.

10. The elevator propulsion system of claim 9 wherein: at least one of the first non-linear path, the second non-linear path and the pole non-linear path is helical.

11. The elevator propulsion system of claim 9 wherein: the first magnetic element includes a strip permanent magnet having a surface with the first polarity facing away from the magnetic screw.

12. The elevator propulsion system of claim 9 wherein: the first magnetic element includes a plurality of first permanent magnets arranged along the first non-linear path, the plurality of first permanent magnets having a surface with the first polarity facing away from the magnetic screw.

13. The elevator propulsion system of claim 12 wherein: the second magnetic element includes a plurality of second permanent magnets arranged along the second non linear path, the plurality of second permanent magnets having a surface with the second polarity facing away from the magnetic screw.

14. The elevator propulsion system of claim 9 wherein: the first magnetic element includes a first strip of ferrous material adjacent to a first pole of a permanent magnet.

15. The elevator propulsion system of claim 14 wherein: the second magnetic element includes a second strip of ferrous material adjacent to a second pole of the permanent magnet.

16. The elevator propulsion system of claim 9 wherein: the motor and the brake are positioned within the internal cavity of the stator.

17. An elevator propulsion system comprising:
a magnetic propulsion assembly configured for connection to an elevator car, the magnetic propulsion assembly including:
a magnetic screw having a first magnetic element having a first polarity, the first magnetic element arranged along a first non-linear path along a longitudinal axis of the magnetic screw and a second magnetic element having a second polarity, the second magnetic element arranged along a second non-linear path along the longitudinal axis of the magnetic screw;
a motor for rotating the magnetic screw about the longitudinal axis to impart motion to the elevator car; and
a brake for stopping rotation of the magnetic screw; and
a stator made from a ferrous material, the stator having a body with an internal cavity, the body including a plurality of poles extending into the cavity, the poles arranged along a pole non-linear path along a longitudinal axis of the stator;
wherein at least one end of the magnetic screw is tapered in diameter to provide an increased airgap between the magnetic screw and the stator at the tapered end.

18. An elevator system comprising:
an elevator car for travel in a hoistway;
a magnetic propulsion assembly coupled to the elevator car, the magnetic propulsion assembly including:
a magnetic screw having a first magnetic element having a first polarity, the first magnetic element arranged along a first non-linear path along a longitudinal axis of the magnetic screw and a second magnetic element having a second polarity, the second magnetic element arranged along a second non-linear path along the longitudinal axis of the magnetic screw;
a motor for rotating the magnetic screw about the longitudinal axis to impart motion to the elevator car;
a brake for stopping rotation of the magnetic screw;
a stator positioned along a length of the hoistway, the stator made from a ferrous material, the stator having a body with an internal cavity, the body including a plurality of poles extending into the cavity, the poles arranged along a pole non-linear path along a longitudinal axis of the stator;
a backup propulsion system having a mechanical screw, wherein the mechanical screw can engage the stator.

19. The elevator system of claim 18 wherein: the first magnetic element includes a strip permanent magnet having a surface with the first polarity facing away from the magnetic screw.

20. The elevator system of claim 18 wherein: the first magnetic element includes a plurality of first permanent magnets arranged along the first non-linear path, the plurality of first permanent magnets having a surface with the first polarity facing away from the magnetic screw.

21. The elevator system of claim 20 wherein: the second magnetic element includes a plurality of second permanent magnets arranged along the second non-linear path, the plurality of second permanent magnets having a surface with the second polarity facing away from the magnetic screw.

22. The elevator system of claim 18 wherein: the first magnetic element includes a first strip of ferrous material adjacent to a first pole of a permanent magnet.

23. The elevator system of claim 22 wherein: the second magnetic element includes a second strip of ferrous material adjacent to a second pole of the permanent magnet.

24. The elevator system of claim 18 further comprising:
a second magnetic propulsion assembly coupled to the elevator car, the second magnetic propulsion assembly including:
a second magnetic screw having a third magnetic element having the first polarity, the third magnetic element arranged along a third non-linear path along a longitudinal axis of the second magnetic screw and a fourth magnetic element having the second polarity, the fourth magnetic element arranged along a fourth non-linear path along the longitudinal axis of the second magnetic screw;
a second motor for rotating the second magnetic screw about the longitudinal axis to impart motion to the elevator car; and
a second brake for stopping rotation of the second magnetic screw; and a second stator positioned along a length of the hoistway, the second stator made from a ferrous material, the second stator having a body with an internal cavity, the body including a plurality of poles extending into the cavity, the poles arranged along a second pole non-linear path along a longitudinal axis of the second stator.

25. The elevator system of claim 24 wherein: a pitch of the first non-linear path and the second non-linear path is opposite a pitch of the third non-linear path and the fourth non-linear path.

26. The elevator system of claim 24 wherein: the motor and the second motor rotate in opposite directions.

27. The elevator system of claim 18 further comprising: a mechanical screw coupled to the elevator car, the mechanical screw traveling within the cavity of the stator, the mechanical screw configured to engage the stator poles upon a fault in the magnetic propulsion assembly.

28. An elevator system comprising:
an elevator car for travel in a hoistway;
a magnetic propulsion assembly coupled to the elevator car, the magnetic propulsion assembly including:
a magnetic screw having a first magnetic element having a first polarity, the first magnetic element arranged along a first non-linear path along a longitudinal axis of the magnetic screw and a second magnetic element having a second polarity, the second magnetic element arranged along a second non-linear path along the longitudinal axis of the magnetic screw;
a motor for rotating the magnetic screw about the longitudinal axis to impart motion to the elevator car; and
a brake for stopping rotation of the magnetic screw; and
a stator positioned along a length of the hoistway, the stator made from a ferrous material, the stator having a body with an internal cavity, the body including a plurality of poles extending into the cavity, the poles arranged along a pole non-linear path along a longitudinal axis of the stator;
wherein at least one end of the magnetic screw is tapered in diameter to provide an increased airgap between the magnetic screw and the stator at the tapered end.

29. A propulsion system comprising:
a screw having a first ferrous element, the first ferrous element arranged along a first non-linear path along a longitudinal axis of the screw, and a second ferrous element, the second ferrous element arranged along a second non-linear path along the longitudinal axis of the screw;
a motor for rotating the screw about the longitudinal axis;
a stator having a body with an internal cavity, the body including a plurality of first poles having a first polarity extending into the cavity, the first poles arranged along a first pole non-linear path along a longitudinal axis of the stator, the body including a plurality of second poles having a second polarity extending into the cavity, the second poles arranged along a second pole non-linear path along a longitudinal axis of the stator;
a backup propulsion system having a mechanical screw, wherein the mechanical screw can engage the stator.

\* \* \* \* \*